(12) United States Patent
Tomlin

(10) Patent No.: US 11,258,799 B2
(45) Date of Patent: *Feb. 22, 2022

(54) VERIFYING NETWORK-BASED PERMISSIONING RIGHTS

(71) Applicant: Palantir Technologies Inc., Palo Alto, CA (US)

(72) Inventor: Luke Tomlin, London (GB)

(73) Assignee: PALANTIR TECHNOLOGIES INC., Palo Alto, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 16/846,873

(22) Filed: Apr. 13, 2020

(65) Prior Publication Data

US 2020/0244666 A1 Jul. 30, 2020

Related U.S. Application Data

(63) Continuation of application No. 16/159,485, filed on Oct. 12, 2018, now Pat. No. 10,686,796, which is a continuation of application No. 15/902,953, filed on Feb. 22, 2018, now Pat. No. 10,142,349.

(51) Int. Cl.
*H04L 29/06* (2006.01)
*G06F 21/62* (2013.01)
*G06F 16/28* (2019.01)

(52) U.S. Cl.
CPC ......... *H04L 63/102* (2013.01); *G06F 16/288* (2019.01); *G06F 21/6218* (2013.01); *H04L 63/101* (2013.01); *H04L 63/108* (2013.01)

(58) Field of Classification Search
None
See application file for complete search history.

(56) References Cited

U.S. PATENT DOCUMENTS

2005/0091346 A1* 4/2005 Krishnaswami ...... H04L 63/101
709/220

* cited by examiner

*Primary Examiner* — Brandon S Hoffman
(74) *Attorney, Agent, or Firm* — Hickman Becker Bingham Ledesma LLP

(57) ABSTRACT

Methods, systems and computer programs for verifying permissioning rights to one or more data resources associated with a data processing platform (DPP) are disclosed. An exemplary method comprises receiving an assertion statement identifying a user, a data resource and an operation performable with respect to the data resource; in response to receiving the assertion statement, generating a hierarchical representation of an access control list for the data resource identified in the statement and evaluating the hierarchical representation against a current state of permissions to determine if the received assertion statement is true or false in relation to said data resource identified in the assertion statement; in response to determining that the assertion is false, generating an error message for output.

20 Claims, 8 Drawing Sheets

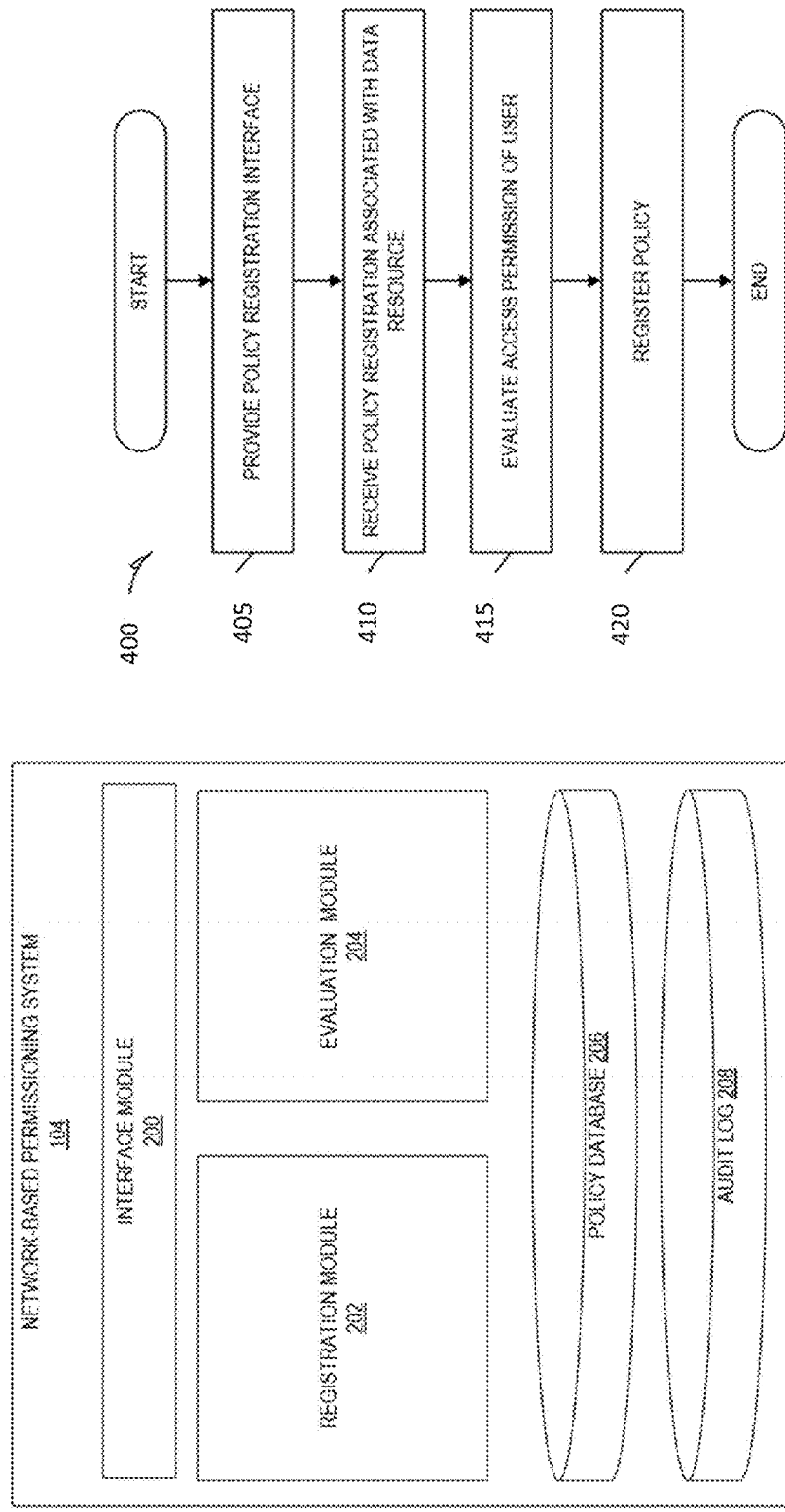

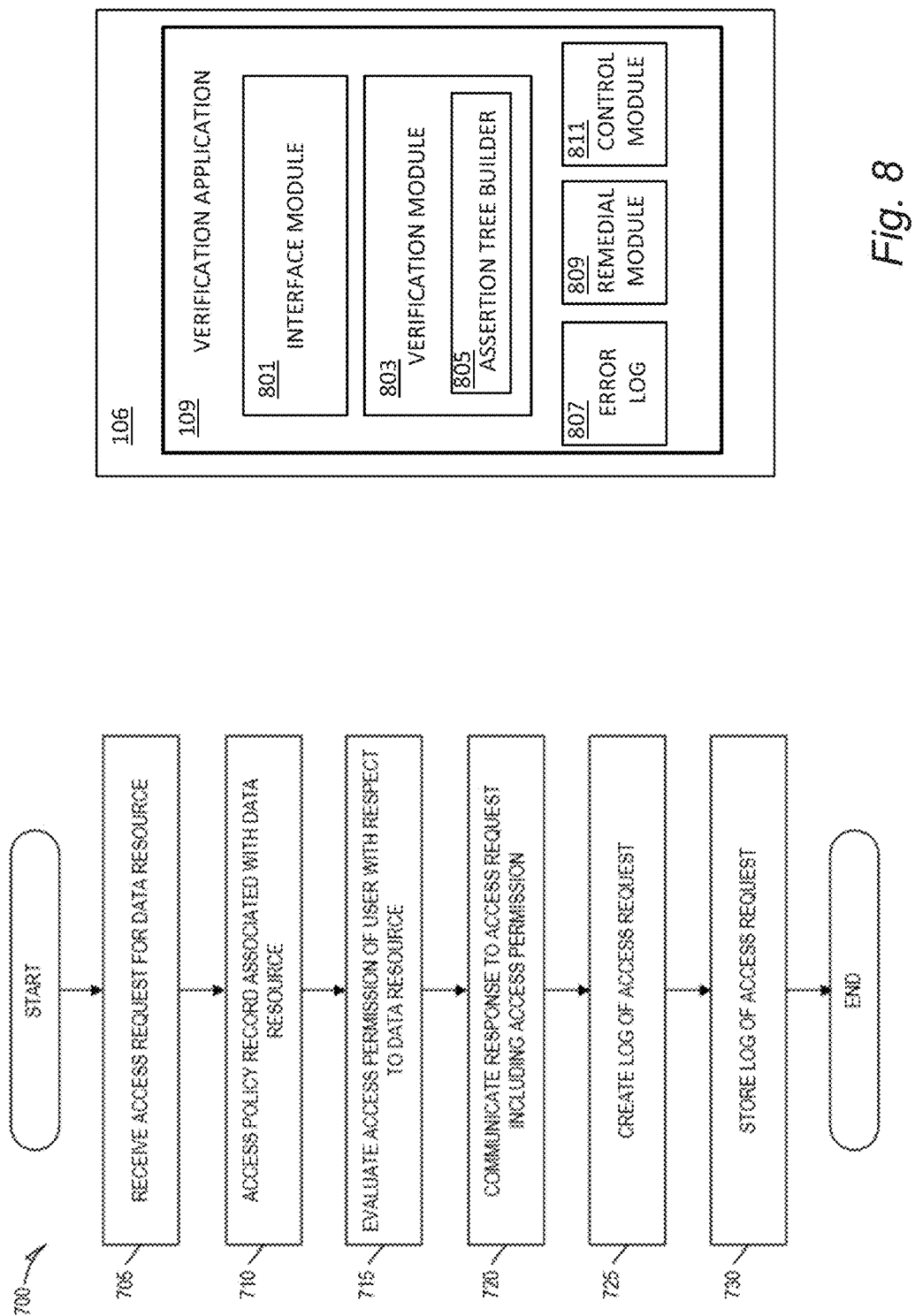

VERIFYING NETWORK-BASED PERMISSIONING RIGHTS

BENEFIT CLAIM

This application claims the benefit under 35 U.S.C. § 120 as a continuation of application Ser. No. 16/159,485, filed Oct. 12, 2018, which claims the benefit under 35 U.S.C. § 120 as a continuation of application Ser. No. 15/902,953, filed Feb. 22, 2018, which claims the benefit under 35 U.S.C. § 119 of Great Britain application 1722042.7, filed Dec. 28, 2017, the entire contents of all of which are hereby incorporated by reference for all purposes as if fully set forth herein. The applicant hereby rescinds any disclaimer of scope in the parent application(s) or the prosecution history thereof and advises the USPTO that the claims in this application may be broader than any claim in the parent application(s).

FIELD OF THE DISCLOSURE

The present disclosure relates to a method and systems for verifying network-based permissioning rights, for example for a data processing platform.

BACKGROUND

Cloud computing is a computing infrastructure for enabling ubiquitous access to shared pools of servers, storage, computer networks, applications and other data resources, which can be rapidly provisioned, often over a network, such as the Internet.

A "data resource" as used herein may include any item of data or code (e.g., a data object) that can be used by one or more computer programs. In example embodiments, data resources are stored in one or more network databases and are capable of being accessed by applications hosted by servers that share common access to the network database. A data resource may for example be a data analysis application, a data transformation application, a report generating application, a machine learning process, a spreadsheet or a database.

Some companies provide cloud computing services for registered customers, for example manufacturing and technology companies, to create, store, manage and execute their own resources via a network. Sometimes, these resources may interact with other resources, for example those provided by the cloud platform provider. Certain data resources may be used to control external systems.

Typical computer systems include a file system to control how data is stored and retrieved. Conventional file systems maintain information regarding user access permissions in conjunction with each stored resource to control users' ability to access the resources. For example, one user may be permitted to view and change a particular resource while another user may only be permitted to view the resource. In some instances, multiple application programs may share common access to resources included in a single file system. For example, a suite of network applications may provide a common interface that provides a user with various related functionalities that allow the user to interact with a common repository of data objects shared by the application suite. In these instances, each application program is typically responsible for evaluating whether a user has permission to access a resource included in the file system based on the user access permission information maintained along with the resource. Not only does this conventional implementation lead to painstaking redundancies in development of such an application, but this also presents the potential for inconsistent handling of user access permissions across each of the applications.

An additional downfall of conventional file systems is in the handling of resources with dependencies to other resources. Because the permission information of each resource is maintained along with the resource itself, in order to determine whether a user may access a resource with dependencies, the evaluator must traverse the entire tree of dependencies of the resource to reach the correct determination. As a result of this read-heavy workflow, computational resources are inefficiently used because of the number of statements that must be executed to determine the actual access permission of the user, which, in turn, leads to a degradation in system performance.

Further, over time, user-initiated change may inadvertently result in certain users, or groups of users, having unintended permissions in relation to one or more resources, or certain users not having permissions in relation resources they were initially permitted to access or update, etc. It is conventionally difficult to identify such changes due to the complexity of the access permissioning system and the sheer amount of data involved. It also generally requires knowledge of how the particular access permissioning system operates, which most users of the data processing platform are unlikely to be familiar with. Inadvertent changes may mean that resources are vulnerable from a security point of view, but how to determine this without using significant expertise and processing resources is challenging.

SUMMARY

A first aspect provides a method of verifying permissioning rights to one or more data resources associated with a data processing platform, the method being performed using one or more processors and comprising:

receiving, from a client device, an assertion statement identifying a user, a data resource and an operation performable with respect to the data resource;

applying the received assertion statement to a network database storing an access control list defining, for each of a plurality of data resources associated with the data processing platform, one or more users having permission to perform one or more operations on the respective data resource, wherein applying the assertion statement is effective to determine if the received assertion statement is true or false in relation to said data resource identified in the assertion statement; and in the event that the assertion is false, generating an error message for output.

Applying the received assertion statement may comprise:

determining a first data structure comprising an assertion tree for said data resource, the assertion tree comprising an expected hierarchical resource graph that represents permissions of the identified data resource and of one or more dependencies of the identified data resource, that would make the assertion statement true, determining a second data structure comprising a corresponding hierarchical resource graph that represents part of the access control list; and comparing the first data structure with the second data structure to determine if the assertion statement is true or false.

The error message may indicate a reason why the assertion is false.

The error message may comprise an indication of remedial action required to make the assertion true.

The indication of remedial action may comprise a guided set of operations performable at the client device required to make the assertion true.

The method may further comprise blocking the identified user's permission to performing one or more operations on the identified resource in the event that the assertion statement identifies a user not having permission to perform the identified operation on the identified data resource, and the error message is indicative that the user currently does have permission to perform the identified operation on the identified data resource.

Blocking the identified user's permission may be temporary.

The received assertion statement may be a single statement, received from the client device, conforming to one or more predetermined syntaxes.

The one or more predetermined syntaxes may permit the user identifier, data resource identifier and operation to be received in any order within the statement.

The one or more predetermined syntaxes may permit the user identifier to define a group of plural users.

The one or more predetermined syntaxes may permit the resource identifier to define a plurality of resources under or dependent on a parent resource.

The one or more predetermined syntaxes may permit the resource identifier to comprise a path.

The one or more predetermined syntaxes may permit a conditional statement to be associated with the operation in the received assertion statement, and wherein applying the assertion statement comprises applying the conditional statement to said operation.

Another aspect provides a computer program, optionally stored on a non-transitory computer readable medium program which, when executed by one or more processors of a data processing apparatus, causes the data processing apparatus to carry out a method comprising:

receiving, from a client device, an assertion statement identifying a user, a data resource and an operation performable with respect to the data resource;

applying the received assertion statement to a network database storing an access control list defining, for each of a plurality of data resources associated with the data processing platform, one or more users having permission to perform one or more operations on the respective data resource, wherein applying the assertion statement is effective to determine if the received assertion statement is true or false in relation to said data resource identified in the assertion statement; and in the event that the assertion is false, generating an error message for output.

Another aspect provides an apparatus configured to carry out a method according to any of the above method definitions, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIG. 3 is a block diagram illustrating various components of the network-based permissioning system, which is provided as part of the network system, consistent with some embodiments;

FIG. 4 is a flow-chart illustrating a method for registering a policy associated with a data resource, consistent with some embodiments;

FIG. 7 is a flow-chart illustrating a method for processing access permissions associated with a data resource, consistent with some embodiments;

FIG. 8 is a block diagram illustrating various components of a verification application, which is provided as part of the network system, according to embodiments of this specification;

DETAILED DESCRIPTION OF CERTAIN EMBODIMENTS

Figure 1:
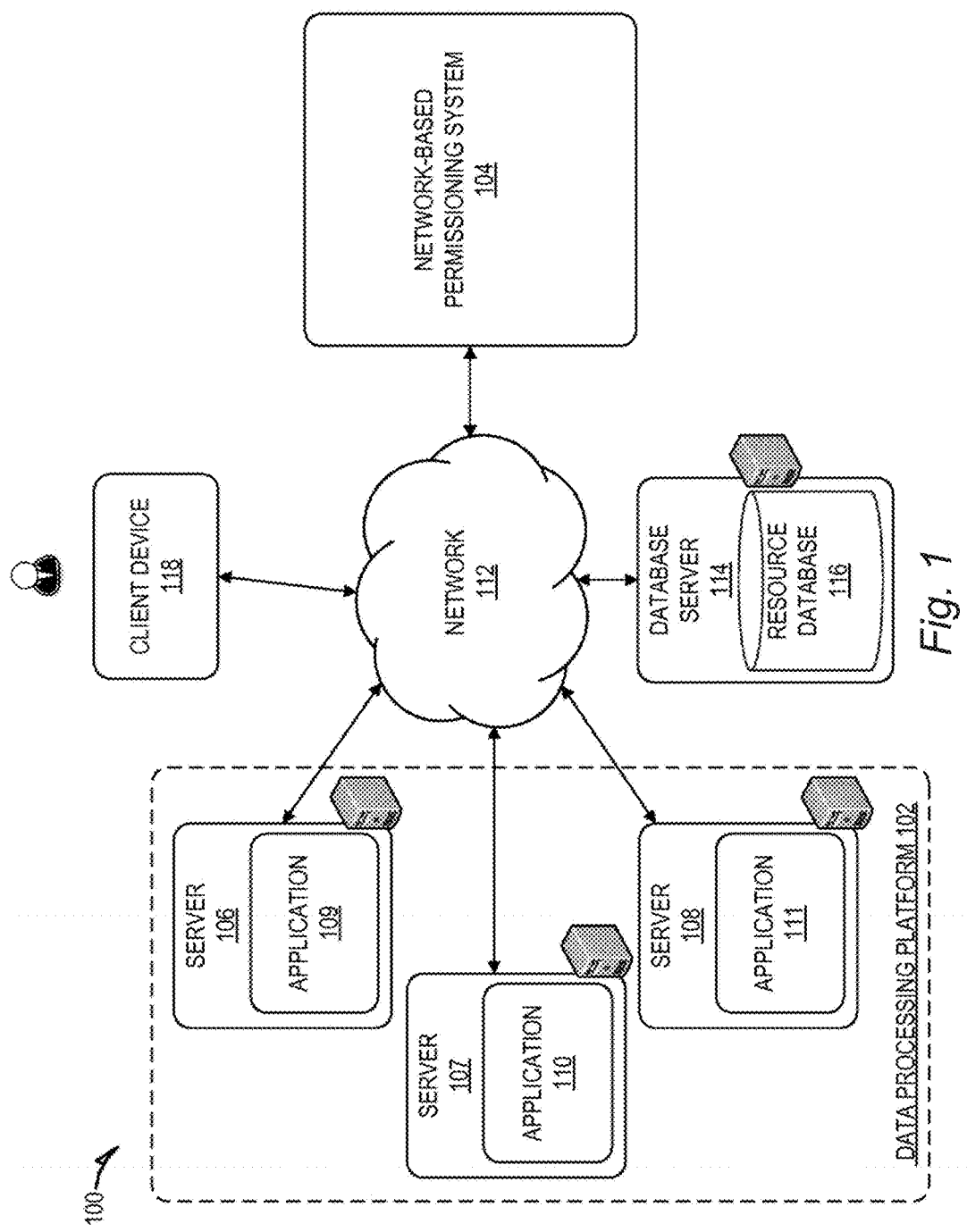
FIG. 1 is a block diagram illustrating a network system comprising a group of application servers of a data processing platform according to embodiments of this specification.

Reference will now be made in detail to specific example embodiments for carrying out the subject matter of the present disclosure. In the following description, specific details are set forth in order to provide a thorough understanding of the subject matter. It shall be appreciated that embodiments may be practiced without some or all of these specific details.

Example embodiments relate to a network-based permissioning system and methods employed thereby for verifying access permissions associated with data resources using assertion statements. A "data resource" as used herein may include any item of data or code (e.g., a data object) that can be used by one or more computer programs. In example embodiments, data resources are stored in one or more network databases and are capable of being accessed by applications hosted by servers that share common access to the network database.

The following embodiments detail an example network-based permissioning system that stores a so-called access control list (ACL) which is a term used in the art for a module that represents resource permissions. It should however be appreciated that the following embodiments can be used with any form of equivalent or similar ACL system or method.

Aspects of the present disclosure may involve registering policies associated with data resources. Policies define access permissions of a user or group of users with respect to a data resource. As part of the process for registering policies, the permissioning system provides an interface to users (e.g., by communicating a set of computer readable instructions to a device of the user) that allows the users to specify the access permissions associated with a data resource. Accordingly, the interface includes a field for identifying the data resource (e.g., using a globally unique resource identifier), fields for identifying users (e.g., using a user identifier), and fields for specifying each identified user's access permission with respect to the identified resource.

Once the policy is entered and submitted to the permissioning system by the user, the permissioning system registers the policy with respect to the data resource. In registering each policy, the permissioning system creates or updates a policy object associated with the data resource in a policy database in which other policy objects associated with other data resources are maintained. Further, the permissioning system maintains a representation of a data resource's permissioning hierarchy that is updated to reflect new or updated policies. In this manner, the permissioning system maintains an effective policy for each data resource because the data object representing the policy includes policy information for the entire hierarchical tree, and as such, the object contains all information that is needed to determine a user's access permission with respect to a particular data resource.

Additional aspects of the present disclosure involve evaluating user access permissions with respect to shared data resources. The permissioning system evaluates user's permissions in response to access requests that may be received from any one of multiple applications hosted by servers communicatively linked (e.g., via a network) to the permissioning system. Each access request identifies a data resource and a user requesting access to the data resource. The permissioning system evaluates the identified user's access permission by accessing policy information included in a policy object associated with the data resource and stored in the policy database. The policy information stored in the policy object includes policies explicitly associated with the data resource as well as policies implicitly associated with the data resource by virtue of the data resource's dependency to other data resources. The permissioning system communicates a response to the application, from which the access request was received, that includes the access permission of the user. The access permission includes one or more operations that the user is authorized to perform with respect to the data resources. In some instances, the access permissions may include operations that are specific to the application from which the access request was received.

FIG. 1 is a network diagram depicting a network system 100 comprising a data processing platform 102 in communication with a network-based permissioning system 104 configured for registering and evaluating access permissions for data resources to which the group of application servers 106-108 share common access, according to an example embodiment. Consistent with some embodiments, the network system 100 may employ a client-server architecture, though the present inventive subject matter is, of course, not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 1 illustrates the data processing platform 102 as including a particular number of servers, the subject matter disclosed herein is not limited to any particular number of servers and in other embodiments, fewer or additional servers and applications may be included.

Each of the servers 106-108 are in communication with the network-based permissioning system 104 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

To access data resources from the resource database 116, the servers 106-108 transmit access requests via the network 112 to the network-based permissioning system 104. An access request includes a data resource identifier and a user identifier corresponding to a user (also referred to herein as a "requesting user") who is utilizing one of the applications 109-111 to access to the data resource (also referred to herein as a "requesting application"). The network-based permissioning system 104 may include an application programming interface (API) or other machine interface to receive such access requests from the server 106-108 hosting the requesting application 109-111.

Upon receiving an access request for a particular data resource, the network-based permissioning system 104 accesses a separately stored policy object associated with the particular data resource. Policy objects are stored in a database of the network-based permissioning system 104, which is maintained independently of the resource database 116.

A policy object is a data structure that includes an identifier (e.g., a globally unique resource identifier) of the data resource to which it is associated, one or more identifiers of a parent data resource from which the data resource depends (referred to as a "parent identifier"), and policy information that includes dependent resource identifiers. The policy information also includes one or more statements that specify operations the user is or is not authorized to perform with respect to the data resource based on satisfaction of one or more conditions. Authorized operations may be globally applicable to the network system 100, or may be specific to any one of the network applications 109-111.

The network-based permissioning system 104 uses the policy information in the corresponding policy object to determine the user's access permissions with respect to the data resource. Once the network-based permissioning system 104 determines the user's access permission with respect to the data resource, the network-based permissioning system 104 communicates a response to the access request to the requesting application. More specifically, the network-based permissioning system 104 communicates one or more data packets (e.g., computer-readable information) to the server hosting the requesting application as a response to the access request. The response to the access request includes the identified requesting user's access permissions with respect to the data resource. The requesting user's access permissions may include one or more authorized operations the user may perform on the data resource.

Accordingly, the network-based permissioning system 104 serves as a centralized permissioning system for the data processing platform 102 to evaluate access permissions of users of the network system 100 with respect to data resource stored in the resource database 116. In this way, the network-based permissioning system 104 obviates the need for the network applications 109-111 to have distinct dedicated permissioning systems. As a result, the network applications 109-111 can operate and function independently from one another while maintaining consistency with respect to user's access permissions of shared data resources.

As shown, the network system 100 also includes a client device 118 in communication with the data processing platform 102 and the network-based permissioning system 104 over the network 106. The client device 118 communicates and exchanges data with the data processing platform 102

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 2:
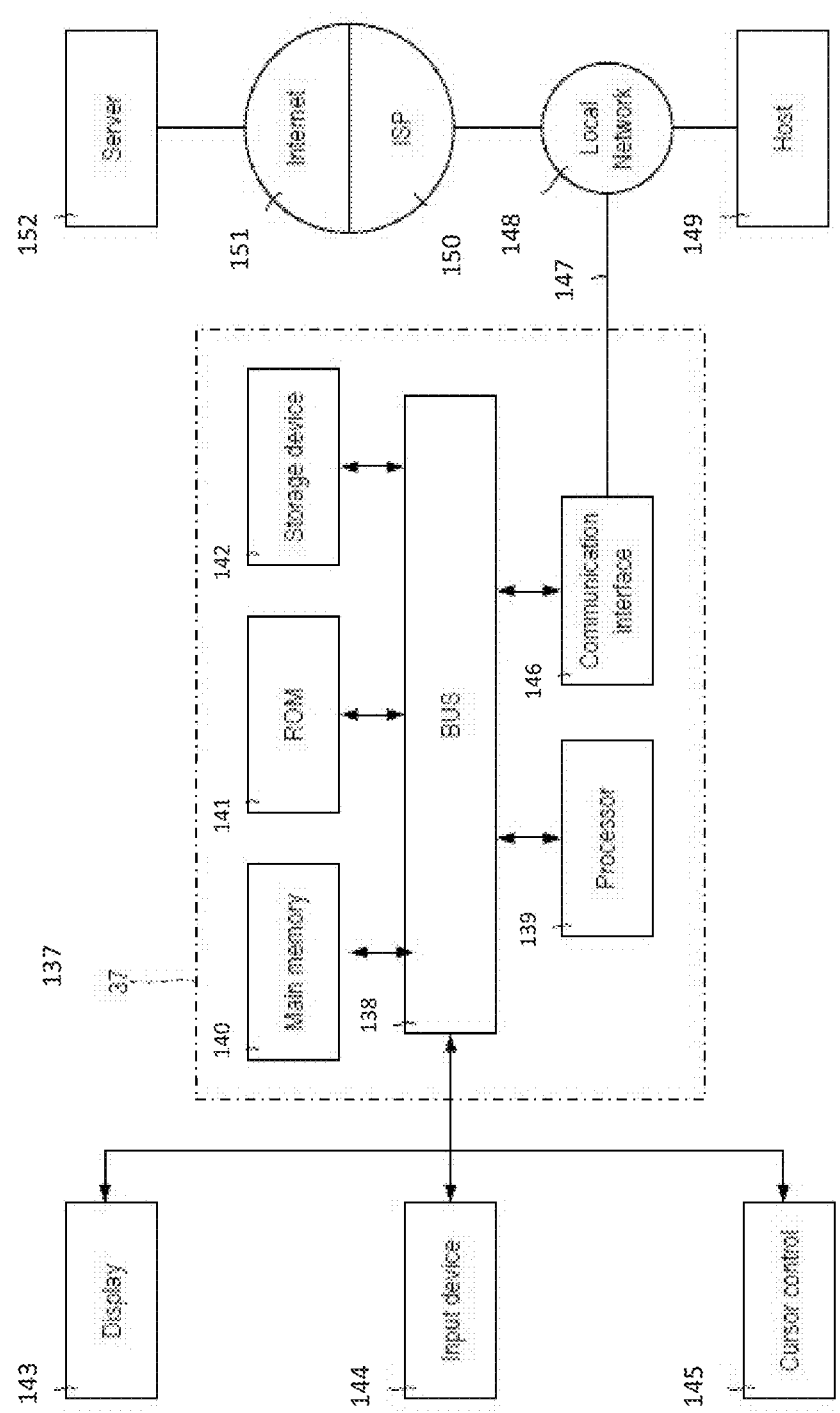
FIG. 2 is a block diagram of a computer system according to embodiments of this specification.

Referring to FIG. 2, a block diagram of an exemplary computer system 137, which may comprise the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

FIG. 3 is a block diagram illustrating various components of the network-based permissioning system 104, which is provided as part of the network system 100, consistent with some embodiments. To avoid obscuring the inventive subject matter with unnecessary detail, various functional components (e.g., modules and engines) that are not germane to conveying an understanding of the inventive subject matter have been omitted from FIG. 3. However, a skilled artisan will readily recognize that various additional functional components may be supported by the network-based permissioning system 104 to facilitate additional functionality that is not specifically described herein.

As is understood by skilled artisans in the relevant computer arts, each functional component (e.g., module) illustrated in FIG. 3 may be implemented using hardware (e.g., a processor of a machine) or a combination of logic (e.g., executable software instructions) and hardware (e.g., memory and processor of a machine) for executing the logic. Furthermore, the various functional components depicted in FIG. 2 may reside on a single computer (e.g., a laptop), or may be distributed across several computers in various arrangements such as cloud-based architectures. Moreover, it shall be appreciated that while the functional components (e.g., modules) of FIG. 2 are discussed in the singular sense, in other embodiments, multiple instances of one or more of the modules may be employed.

The network-based permissioning system 104 is shown as including an interface module 200, a registration module 202, and an evaluation module 204, all configured to communicate with each other (e.g., via a bus, shared memory, a switch, or application programming interfaces (APIs)). The aforementioned modules of the network-based permissioning system 104 may, furthermore, access a policy database 206 and an audit log 208. The policy database 206 and the audit log 208 each reside on a machine-readable storage medium of the network-based permissioning system 104. The policy database 206 and audit log 208 may be maintained independent of one another.

The interface module 200 receives requests from various devices (e.g., servers 106-108) and communicates appropriate responses to the requesting devices. The interface module 200 provides interfaces to allow devices to request access to data resources stored in the resource database 116. For example, the interface module 200 may receive access requests for data resources in the form of application programming interface (API) request.

The interface module 200 also provides user interfaces to users of the network system 100 (e.g., by communicating a set of computer-readable instructions to computer devices of the users). The interface module 200 also receives user input received through such user interfaces, and passes the received user input on to the applicable component of the network-based permissioning system 104. As an example, the interface module 200 provides user interfaces to allow users to register and modify policies associated with data resources stored in the resource database 116. An example of such user interfaces provided by the interface module 200 is discussed below.

Policies form the basis of the network-based permissioning system 104's security model. Each policy is composed of a set of unordered statements, and each statement evaluates to a Boolean value of either "TRUE" or "FALSE" and includes: an operation or set of operations that is affected by the statement, an action to take with the specified operation, and a condition used to determine application of the specified application to specified operations.

For each data resource stored in the data resource database 116, the network-based permissioning system 104 maintains a data structure in the policy database 206 that includes a simple resource graph designed to emulate basic file system-like structures and also accommodate dependencies on related resources. Each node in the resource graph represents a data resource. In this way, the network-based permissioning system 104 maintains a representation of a data resource's permission hierarchy in a simple unified object that can be evaluated in isolation. Accordingly, the policy object provides an "effective policy" for each data resource in that each policy object contains the policy information for the entire hierarchical access permission tree in an ordered format such that the evaluation module 204 only needs the effective policy to determine a user's permissions.

The registration module 202 is responsible for registering policies associated with data resources stored in the resource database 116. As part of the registration process, the registration module 202 receives and processes policy registration data submitted by users through user interfaces provided by the interface module 200 (e.g. by providing a set of computer-readable instructions to computer devices of the users) that allow the users to register and modify policies associated with data resources.

During the registration process, a user may interact with various interface elements (e.g., through one or more input devices) of user interfaces to specify policy registration data including: a resource identifier corresponding to a data resource, and a policy associated with the data resource. Each policy may include a user identifier or set of user identifiers corresponding to a user or group of users, though it shall be appreciated that in some instances, a policy may be user agnostic (e.g., allow access before Dec. 25, 2015). Each policy specifies operations users are authorized to perform with respect to the data resource. Upon determining that the user is authorized to create a new policy or modify an existing policy, the registration module 202 registers the policy specified by the user.

In registering a policy, the registration module 202 stores a policy object in the policy database 206. Each policy object is a data structure that is linked to a data resource, although the policy objects and data resources are separately maintained—policy objects are stored in the policy database 206 and data resources are stored in the resource database 116. Each policy object includes: a resource identifier corresponding to the data resource to which the policy is associated; one or more parent identifiers, each of which identify a parent data resource from which the data resource is dependent, if applicable; and a policy associated with the data resource.

Each policy includes one or more statements that specify particular operations that a user is authorized to perform with respect to a particular data resource. In particular, each statement includes a field for each operation (or set of operations), an action, and a condition. The operation field corresponds to an operation that a user is authorized to perform with respect to the data resource. Each operation may be globally applicable to the network-based permissioning system 104 or may be specifically related to one of the network applications 109-111.

Each statement executes according to satisfaction of the particular conditions included therein. As an example, the condition may specify a particular user identifier corresponding to an allowed user, and the condition is satisfied if the user identifier of the requesting user matches the user identifier of the allowed user. As another example, the condition may be a temporal condition such as a time range in which a requesting user may access the data resource, and in this way, the conditions may be used to provide an expiration date (or time) for a policy. Additional example conditions supported by the network-based permissioning system 104 include: a DEPENDENT condition to check if the resulting operations from dependencies contain all or any of the condition specified operations; a GROUP condition to check if a user possesses all or any of the condition specified groups; a NOT condition to negate the result of another condition; an OR condition that takes two or more conditions and checks if any of them evaluate to true; an AND condition that takes two or more conditions and checks if all of them evaluate to true; a USER condition to check if the requesting user is the allowed user; and a USER TYPE condition that checks if the user is of the allowed type (e.g., user or service). It shall be understood the conditions supported by the network-based permissioning system 104 may be extensible and are thus not limited to the above referenced examples. Additionally, conditions may be combined together into arbitrary Boolean expressions. The following is an example of such a combination: "NOT (USER=X)"; "AND(USER=X, GROUP=Y)".

Actions included in the action field define a behavior associated with a particular statement such as allowing or denying a user's ability to perform an operation. Further, the actions may include special overrides to other actions in a data resource's policy inheritance chain. As an example, the actions may include the following: an ALLOW action that grants a specified operation to a current context if the condition evaluates to "TRUE"; a DENY action that denies a specified operation if the condition evaluates to "TRUE" a FORCE-ALLOW action that grants specified operations as a special override and causes the system to ignore all DENY and FORCE-DENY actions, if the condition evaluates to "TRUE"; a FORCE-DENY action that denies specified operations unless explicitly overridden by a FORCE-ALLOW statement; a ALLOW-ON-CHILDREN or DENY-ON-CHILDREN that apply only when inherited (e.g., instead of saying a user has (or does not have) rights on a specific node in the graph, a resource can be configured to grant (or deny) access only for child nodes). It shall be understood the actions supported by the network-based permissioning system 104 may be extensible and are thus not limited to the above referenced examples. Further details regarding the registration process performed by the registration module 202 are discussed below in reference to FIG. 4, according to some example embodiments.

The evaluation module 204 is configured to evaluate user access permissions with respect to data resources stored in the resource database 116. The evaluation of user access permissions, in most instances, is triggered by receipt of an access request received via an API from a network application supported by the network-based permissioning system 104 (e.g., network applications 109-111). The access request includes a data resource identifier corresponding to the data resource for which access is being requested, and a user identifier corresponding to the requesting user. In some instances, the access request may further include one or more filters identifying one or more particular operations or sets of operations that are of interest.

In evaluating a user's access permission with respect to a particular data resource, the evaluation module 204 accesses a policy object associated with the data resource from the policy database 206. To evaluate requesting user's access permission for a particular data resource, the evaluation module 204 performs a depth-first evaluation and then follows a simple inheritance model. During evaluation, the evaluation module 204 tracks multiple operation sets corresponding to actions discussed above. In an example, the evaluation module 204 tracks: 1) ALLOW statements; 2) FORCE-DENY statements; and 3) FORCE-ALLOW statements.

At each node of the resource graph included in the policy object stored in the policy database 206, the evaluation module 204 evaluates the parent data resource, then performs a lazy evaluation of the dependencies (e.g. dependencies evaluated only if a condition requires the results), then evaluates the local node (e.g. the data resource for which access permission is being evaluated), and returns a merge of parent and local results.

At the top most request level, the evaluation module 204 collapses the tracked operation sets into a single set. The process for collapsing the tracked operation sets includes creating an empty set and adding all explicitly allowed operations in the empty set. The evaluation module 204 then removes all explicitly denied operations. During this operation, a special operation is used to remove all previously granted operations. The evaluation module 204 then adds all FORCE-ALLOW statements to the set.

Upon determining a user's access permissions, the evaluation module 204 communicates a response to a received access request to a requesting network application 109-111 (e.g., via appropriate API call). The response includes a set of operations the user is authorized to perform with respect to the data resource. In instances in which the access request includes operation filters, the response communicated to the requesting application 109-111 may include only those operations of interest to the application 109-111, and as such, the generation of the response may include omitting a portion of the set of all operations to users authorized to perform with respect to the data resource. Based on the response received from the evaluation module 204, the requesting application 109-111 may either enable or disable one or more operations that the user may perform with respect to the data object depending on the user's determined access permissions.

For each received access request, the evaluation module 204 creates and stores an access request log in an audit log 208. Each access request log includes a resource identifier, a user identifier, determined access permissions of the user, an identifier of the requestor (e.g., IP address), and a timestamp.

FIG. 4 is a flow-chart illustrating a method 400 for registering a policy associated with a data resource, according to some example embodiments. The method 300 is embodied in computer-readable instructions for execution by one or more processors such that the operations of the method 400 are performed in part or in whole by the network-based permissioning system 104; accordingly, the method 400 is described below by way of example with reference thereto. However, it shall be appreciated that at least some of the operations of the method 400 may be deployed on various other hardware configurations, and the method 400 is not intended to be limited to the network-based permissioning system 104.

At operation 305, the interface module 200 provides a policy registration interface to a computer device for registering a policy associated with a data resource. For example, the interface module 200 may provide a set of computer-readable instructions to the client device 118 that causes the computer device to display the policy registration interface. The user interface may include a field in which a registering user enters a user identifier (e.g., name, username, an email address, a phone number, or other such identifier) or user group identifier. The user interface may further include a graphical element, for example a drop-down menu, for specifying the access permissions of the identified user or group of user. The user interface may also display existing user access permissions included in the policy of the data resource. For example, the user interface may displays a user identifier (the user's name) corresponding to a user who has permission to access the data resource. In particular, the user identifier may be listed as an "Owner" of the data resource, which indicates that the user has administrative privileges with respect to the data resource. Additionally, the user interface may include a user group identifier corresponding to a group of users who have access permissions with respect to the data resource. In particular, the group of users identified by the user group identifier may be authorized to edit the data resource. A button may be used by the registering user to submit the policy to the registration module 202. More specifically, upon user selection of the button, the interface module may provide the registration module 202 with a policy registration for the data resource. Returning to FIG. 4, at operation 410, the evaluation module 204 may receive the policy registration associated with the data resource. The policy registration may include a user identifier and the specified access permissions of the user with respect to the data resource.

At operation 415, the evaluation module 204 evaluates the access permissions of the registering user. In particular, the evaluation module 204 determines whether the registering user is authorized to edit the policy associated with the data resource. Further details of the process of evaluating user access permissions are discussed below in reference to FIG. 6, according to some example embodiments.

At operation 420, the registration module 202 registers the policy associated with the data resource based on the access permissions of the registering user authorizing the registering user to modify the policy of the data resource. In instances in which the data resource does not have an existing policy, the registering of the policy includes creating and storing a policy object associated with the data resource in the policy database 206. In instances in which the data resource has an existing policy, the registering of the policy includes updating a policy object associated with the data resource that is stored in the policy database 206. The stored or updated policy object includes the statements included in the policy specified by the registering user via the policy registration interface.

Figure 5:
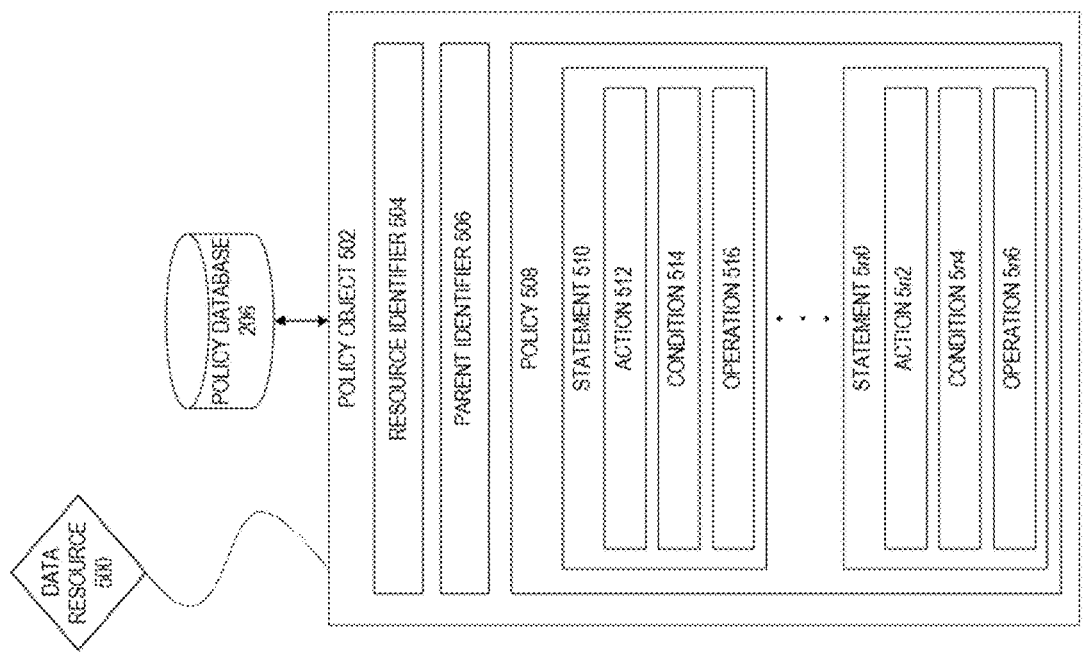
FIG. 5 is an interface diagram illustrating a portion of an interface for registering a policy associated with a data resource, consistent with some embodiments.

As an example, FIG. 5 is a data structure diagram illustrating elements of a policy object 502 associated with a data resource 500, according to some example embodiments. The data resource 500 is stored in the resource database 116 while the policy object 502 is stored in the policy database 206. The policy object 502 includes a resource identifier 504 that identifies the data resource 500. The policy object 502 further includes a parent identifier 506 field that includes an identifier of a parent data resources from which the data resource 500 depends. In instances in which the data resource 500 does not have any dependencies, the parent identifier 506 includes a null entry.

The policy object 502 further includes a policy 508 that comprises a set of unordered statements 510-5$n$0. By maintaining the parent identifier 506 in the policy object 502 associated with the data resource 500, the network-based permissioning system 104 is able to track the inheritance chain of the data resource 500. The inheritance chain of the data resource 500 includes a parent data resource (other data resources from which the data resource 500 depends) along with child data resources (other data resources that depend on the data resource 500). Accordingly, the statements 510-5$n$0 include statements explicitly associated with the data resource 500. Statements that are implicitly associated with the data resource 500 through inheritance from the dependency of data resource 500 on the parent resource identified in the parent identifier 506 field may be evaluated by accessing the policy object associated with the parent resource. The statement 510 includes action 512, condition 514, and operation 516. The action 512 defines the behavior associated with the statement 510. The condition 514 is used to determine application of the action 512 to the operation 516. The operation 516 is the operation affected by the statement 510. The action 510 may specify that the user is either allowed or denied to perform operation 516 based on whether the condition 514 is satisfied. The network-based permissioning system 104 may further support actions that override other specified operations.

In instances in which a data resource 500 for which a policy registration has been submitted includes a dependency on another data resource, the evaluation module 204 updates a hierarchical representation of the access permissions of the data resource 500 in accordance with the received policy during the registration of the policy, which may include applying the registered policy to other data resources in the inheritance chain of the data resource 500. Accordingly, the registering of the policy may include modifying policy objects associated with data resources (e.g., parent and child data resources) in the inheritance chain to include at least a portion of the plurality of permission statements from the newly registered policy.

Figure 6:
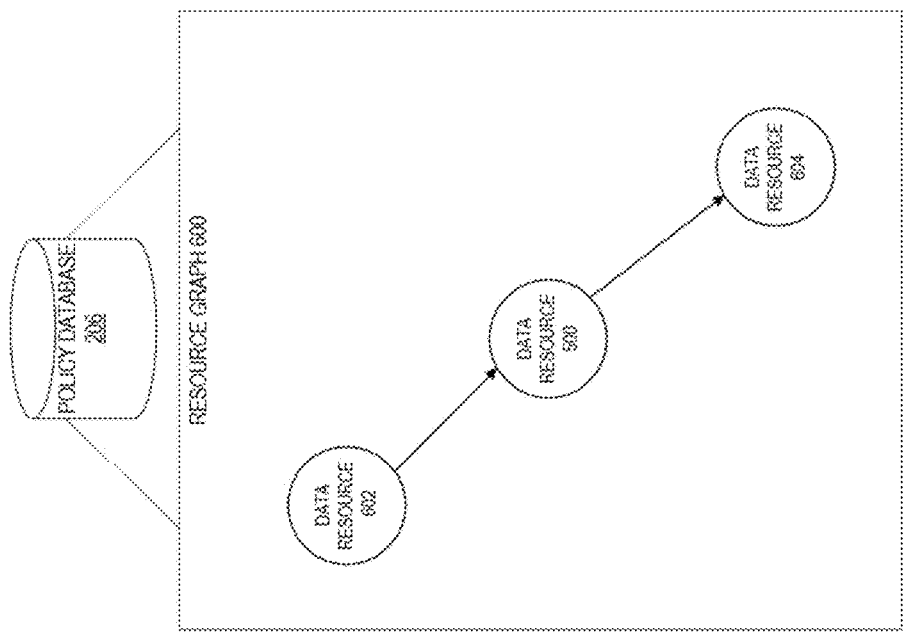
FIG. 6 is a data structure diagram illustrating elements of a policy object maintained in a database of the network-based permissioning system, according to embodiments of this specification.

As an example, FIG. 6 is a data structure diagram illustrating a resource graph 600 maintained in the policy database 206 of the network-based permissioning system 104, according to some embodiments. The resource graph 600 may be maintained for each of the data resources stored in the data resource database 116. Each resource graph may be maintained independently from policy objects or as part of policy objects. For example, the resource graph 600 may be stored as part of the policy object 502.

The individual nodes in the resource graph 600 represent data resources, though the nodes do not themselves include the contents of the data resources that they represent. For example, the resource graph 600 is stored in the policy database 206 of the network-based permissioning system 104 while each of the data resources 500, 602, and 604 are stored separately in the resource database 116.

As shown, the resource graph 600 includes a representation of an inheritance chain of the data resource 500. In particular, the resource graph 600 includes a representation of a dependency of the data resource 500 on parent data resources 602. Further, the resource graph 600 includes a representation of a child resource—data resource 604—that is dependent on the data resource 500. In registering a new policy associated with data resource 500, the registration module 202 may update an effective policy associated with data resource 604 to include at least a portion of the statements 510-5n0 included in the policy associated with data resource 500. By maintaining an effective policy associated data resource, the network-based permissioning system 104 tracks inherited access permissions of dependent data resources. Thus, by maintaining a representation of an effective policy of the inheritance chain of the data resource 500, the network-based permissioning system 104 maintains all policy information with respect to a particular data resource in a policy object associated with the data resource such that the evaluation module 204 of the network-based permissioning system 104 needs only to read a single node in order to compute the access permissions of the whole resource graph 600.

FIG. 7 is a flowchart illustrating a method 700 for processing access permissions associated with a data resource, according to some embodiments. The method 700 is embodied in computer-readable instructions for execution by one or more processors such that the operations of the method 700 are performed in part or in whole by the network-based permissioning system 104; accordingly, the method 700 is described below by way of example with reference thereto. However, it shall be appreciated that at least some of the operations of the method 700 may be deployed on various other hardware configurations, and the method 700 is not intended to be limited to the network-based permissioning system 104.

At operation 705, the interface module 200 receives an access request for a data resource. For example, the interface module 200 may receive an access request from one of the network applications 109-111 via an API call to access the data resource 500. The access request includes a resource identifier (e.g., resource identifier 504) corresponding to the data resource (e.g., data resource 500) and a user identifier corresponding to the requesting user. The user identifier may, for example, be or include a name, a username, an e-mail address, an employee number, or any other unique identifier suitable for identifying the user. Consistent with some embodiments, as part of the receiving of the access request, the interface module 200 receives a bearer token, which is a cryptographically secure string that represents a user. The network-based permissioning system 104 may interact with various user network services (e.g., via data exchanges over the network 112) that check the validity of the token, and return a user object that includes the user identifier.

At operation 710, the evaluation module 204 accesses a policy object (e.g., policy object 502) associated with the data resource from the policy database 206 in response to receiving the access request for the data resource. For example, upon receiving an access request for the data resource 500, the evaluation module 204 accesses the policy object 502 from the policy database 206. As discussed above, the policy object includes a list of unordered statements that define the requesting user's access permissions with respect to the policy object. The policy object may include statements explicitly registered in association with the data resource as well as statements inherited by the data resource based on a dependency to other data resources.

At operation 715, the evaluation module 204 evaluates the access permissions of the identified user with respect to the identified data resource based on the information included in the policy object. The access permission of the user with respect to the data resource refers to a set of operations the user is authorized to perform on the data resource. Accordingly, the evaluation of the access permission of the user includes determining a set of operations the user is authorized to perform with respect to the data resource, which depends on whether conditions included in the set of statements included in the policy are satisfied. Hence, the evaluation of the access permission of the user may include determining whether conditions included in set of statements are satisfied. As an example, a statement in the policy may include a condition that specifies a particular user identifier corresponding to an allowed user, and the determination that the condition is satisfied is based on the user identifier of the requesting user matching the user identifier of the allowed user. As another example, a statement in the policy may include a temporal condition that specifies as a time range in which a requesting user may access the data resource, and the determination that the condition is satisfied is based on whether the access request is received within the time range.

In evaluating a user's access permission with respect to a particular data resource, the evaluation module 204 accesses a policy object associated with the data resource from the policy database 206. To evaluate the requesting user's access permission for a particular data resource, the evaluation module 204 performs a depth-first evaluation and then follows a simple inheritance model. At each node of the resource graph included in the policy object stored in the policy database 206, the evaluation module 204 first evaluates the parent data resource, then, performs a lazy evaluation of the dependencies (e.g. dependencies evaluated only if a condition requires the results), then evaluates the local node (e.g. the data resource for which access permission is being evaluated), and returns a merge of parent and local results. At the top most request level, the evaluation module 204 collapses the tracked operation sets into a single set. The process for collapsing the tracked operation sets includes creates an empty set adding all explicitly allowed operations in the empty set. The evaluation module 204 then removes all explicitly denied operations. During this operation, a special operation is used to remove all previously granted operations. The evaluation module 204 then adds all override allow statements (e.g., FORCE-ALLOW statements) to the set.

At operation 720, the evaluation module 204 works in conjunction with the interface module 200 to communicate a response to the access request to the requesting application (e.g., via API call). The response to the access request includes the access permission of the user and accordingly, the response includes a set of operations the user is authorized to perform with respect to the application. Based on the access permissions included in the response, the requesting application may either grant or deny the user's access to the data resource, which may include either enabling or disabling certain operations or functionalities of the requesting application.

At operation 725, the evaluation module 204 creates a log of the access request. The log of the access request includes an indication of receipt of the access request, a time corresponding to receipt of the access request, an identifier of the user, and the determined access permission of the user. At operation 730, the evaluation module 204 stores the log in the audit log 208.

Verification of Permissioning Rights

Embodiments will now be described in relation to methods, systems and computer-implemented processes for verifying permissioning rights, for example as defined in the multiple policy objects associated with respective resources.

Embodiments particularly relate to providing a verification module, which may be an application provided on one or more of the servers 106, 107, 108, which enables one or more users of said servers to verify permissions in such a way that they can simply ensure that certain things will happen, rather than trying to understand what the outcomes of certain things look like. More particularly, methods and systems relate to receiving from a client device, for example at the verification module, an assertion statement identifying a user, a data resource and an operation performable with respect to the data resource.

In this respect, it will be understood that an assertion statement is a specific type of computer-readable statement that asserts something to be true, and which returns an error or similar result if the parameters in the assertion statement is or are false.

The assertion statement may be applied to a network database, for example the network-based permissioning system 104 shown in FIG. 1, which stores an access control list (ACL) defining, for each of a plurality of data resources associated with the data processing platform, which may be distributed over multiple servers, one or more users having permission to perform one or more operations on the respective data resource, wherein applying the assertion statement is effective to determine if the received assertion statement is true or false in relation to said data resource identified in the assertion statement.

In the event that the assertion is false, an error message may be generated for output.

The access control list (ACL) may be of any suitable type, and in the above embodiments comprises the set of policy objects for respective data resources. The access control list may have any suitable data structure.

In some embodiments, applying the assertion statement may comprise using an application program interface (API) operating under processor control to interpret the assertion statement and issue appropriate queries to the access control list (ACL.)

In some embodiments, applying the received assertion statement may comprise: determining a first data structure comprising an assertion tree for said data resource, the assertion tree comprising an expected hierarchical resource graph that represents permissions of the identified data resource and of one or more dependencies of the identified data resource, that would make the assertion statement true, determining a second data structure comprising a corresponding hierarchical resource graph that represents part of the access control list, and comparing the first data structure with the second data structure to determine if the assertion statement is true or false.

This enables processing of the assertion statement against the access control list in a highly efficient manner. Rather than checking through all policy objects, a much smaller set, only relevant for comparing with the determined assertion tree for the particular assertion, is needed for comparison. Examples are given below.

The error message may indicate a reason why the assertion is false. The error message may indicate the assertion that created the assertion that causes it to be false.

In some embodiments, the error message may comprise, or be accompanied with, an indication of remedial action required to make the assertion true. The indication of remedial action may comprise a guided set of operations performable at the client device required to make the assertion true. For example, a set of ordered actions may be presented to the user in order to make the assertion true, assuming the user has appropriate permissions to make such changes.

In some embodiments, the operation of blocking the identified user's permission to perform one or more operations on the identified resource may be performed or enabled, possibly automatically, in the event that the assertion statement identifies a user not having permission to perform the identified operation on the identified data resource, and the error message is indicative that the user currently does have permission to perform the identified operation on the identified data resource. This may ensure that a precarious situation is avoided, e.g. that a particular user is unexpectedly able to view and/or edit a resource that was assumed to be confidential. The blocking may be temporary to enable investigation by an administrator, wherein it may not be conducive to make a permanent block.

In some embodiments, the received assertion statement is a single statement, received from the client device, conforming to one or more predetermined syntaxes. The one or more predetermined syntaxes may permit the user identifier, data resource identifier and operation to be received in any order within the statement. The one or more predetermined syntaxes may permit the user identifier to define a group of plural users, i.e. directly or indirectly. For example, the syntax may enable a group to be identified by a group name or identifier, whereby the members of the group can be determined separately. For example, the syntax may enable a set of users having an assigned role, e.g. administrator or developer, to be determined separately. The one or more predetermined syntaxes may permit the resource identifier to define a plurality of resources under or dependent on a parent resource. Therefore, when building the abovementioned assertion tree, all resources dependent on a resource identified in the assertion statement may be included in the assertion tree for the comparison.

In some embodiments, the one or more predetermined syntaxes may permit the resource identifier to comprise a path, e.g. a URL or similar. The resource identifier may be a directory, and the policy objects for any files or subfolders under said directory may be automatically considered as a result.

In some embodiments, the one or more predetermined syntaxes may permit one or more conditional statements to be associated with the operation in the received assertion statement, and wherein applying the assertion statement comprises applying the conditional statement to said operation. For example, conditional statements such as CAN, CAN NOT, ONLY and CAN ONLY may be allowable and applicable parameters of the one or more syntaxes.

For example, a CAN statement may assert that the identified user(s) have permission to do the stated one or more operations on the resource or resources.

For example, a CAN NOT statement may assert that the identified user(s) do not have permission to do the stated one or more operations on the resource or resources.

For example, an ONLY statement may assert that the identified user(s) are the only users permitted to do the stated one or more operations on the resource or resources.

For example, a CAN ONLY statement may assert that the identified user(s) can only perform the stated one or more operations on the resource or resources and cannot perform the operations anywhere else.

It will be appreciated that the above conditional statements permit a user to understand quickly and efficiently whether or not an assumed permissioning situation is correct, using a wide range of options, through a simple assertion statement quickly processed.

The assertion statement may be applied manually, or it may be applied automatically, for example by storing the statement and repeating its application to the access control list at periodic intervals, which may be user configured using software.

A log of errors generated from applying the assertion statement to the access control list may be stored, building a history of changes that occur over time.

In some embodiments, any user can enter and apply an assertion statement which comprises any user identifier. In other words, users may not be restricted to assertions of their own user identifier. This may be appropriate for users connected with the data processing platform, for example administrators, and/or local administrators connected with each server 106, 107, 108, although they may be restricted to applying assertions only comprising user identifiers for their employees, as defined in a user group for the particular server.

FIG. 8 is a block diagram illustrating various components of the application 109 stored and operating on the server 106 shown in FIG. 1. In this case, the application 109 is a verification application operating in accordance with example embodiments. In overview, the verification application 109 is arranged as one of a number of applications stored and operating on the server 106, others of which may relate to service based resources, such as for transforming data and for accessing the database server 114 etc. The verification application 109 may communicate with the network-based permissioning system 104 in order to verify and, in some cases, offer remedial steps to correct erroneous preferences and/or to exert some degree of control, such as in blocking certain permissions, which may be temporary.

To avoid obscuring the inventive subject matter with unnecessary detail, various functional components (e.g., modules and engines) that are not germane to conveying an understanding of the subject matter have been omitted from FIG. 8. However, a skilled artisan will readily recognize that various additional functional components may be supported by the verification application 109 to facilitate additional functionality that is not specifically described herein.

As is understood by skilled artisans in the relevant computer arts, each functional component (e.g., module) illustrated in FIG. 8 may be implemented using hardware (e.g., a processor of a machine) or a combination of logic (e.g., executable software instructions) and hardware (e.g., memory and processor of a machine) for executing the logic. Furthermore, the various functional components depicted in FIG. 8 may reside on a single computer (e.g., a laptop), or may be distributed across several computers in various arrangements such as cloud-based architectures. Moreover, it shall be appreciated that while the functional components (e.g., modules) of FIG. 8 are discussed in the singular sense, in other embodiments, multiple instances of one or more of the modules may be employed.

The verification application 109 is shown as including an interface module 801, a verification module 803, which includes an assertion tree builder 805, an error log 807, a remedial module 809 and a control module 811, all configured to communicate with each other (e.g., via a bus, shared memory, a switch, or application programming interfaces (APIs)). The error log 807 may reside on a machine-readable storage medium of the verification application 109.

The interface module 801 receives requests in the form of assertion statements from various devices (e.g., one or more client devices 118 and/or servers 106, 107, 108) and communicates appropriate responses to the requesting devices. The interface module 801 provides interfaces to allow devices to request verification of permissions held by the network-based permissioning system 104. For example, the interface module 801 may be in the form of application programming interface (API) that interprets received assertion statements. The application programming interface (API) may similarly interpret responses from the network-based permissioning system 104 and issue output, e.g. indications of FALSE responses to the assertion for storage in the error log 807, amongst other things.

The interface module 801 therefore provides user interfaces to users of the network system 100 (e.g., by communicating a set of computer-readable instructions to computer devices of the users). The interface module 801 receives assertion statements received through such user interfaces, and provided the assertions statements conform to one or more predetermined syntaxes, applies the received assertion statements on to the verification module 801.

The verification module 801 receives the interpreted assertion statements from the interface module 801 and, responsive thereto, queries the network-based permissioning system 104 appropriately to apply the assertion. In other words, the verification module 801 determines based on the policy objects in the network-based permissioning system 104 whether or not the assertions statement is true or false. In some embodiments, this is by means of building an assertion tree from the received assertion statement, which is handled by the assertion tree builder 805.

The assertion tree builder 805 determines a first data structure which represents an assertion tree, being an expected hierarchical resource graph that represents permissions of the identified data resource and of one or more dependencies of the identified data resource, that would make the assertion statement true. In some cases, the assertion tree may be relatively simple, for example comprising a small number of policy objects, or may be more complex, for example where the assertion statement refers to a group of users, operations, and/or data resources, which may be referred to directly or indirectly, e.g. by identifying a group, or using an UNDER statement. Effectively, the assertion tree builder 805 builds the assertion tree to mimic what it expects to see somewhere within the network-based permissioning system 104, and which represents only a subset of the hierarchy represented therein to avoid having to verify against a large number of policy objects and their interlinked dependencies.

Having determined the first data structure, the verification module 803 then requests from the network-based permissioning system 104 the corresponding set of policy objects reflecting the current state of permissions, building a second data structure representing the actual hierarchical resource graph representing this part of the access control list (ACL.) The verification module 803 then compares the first and second data structures; a match indicates that the assertion is TRUE, whereas any discrepancy indicates that the assertion is FALSE. Thus, use of the assertion tree builder 805 is such as to enable verification using only a fraction of the policy objects within the access control list (ACL) whilst enabling a rich and large combination of possible permissioning situations to be verified.

The verification module 803 is further responsive to determining a FALSE response to generate an error message or similar indication, which may be displayed to the requesting user and/or stored in the error log 807. The error log 807 may store a potentially large number or list of errors, particular to users and/or data resources. The error log 807 may arrange and present its data in any meaningful and useful way through a suitable user interface. For example, the data stored in the error log may be filtered and/or automatically deleted after a predetermined period of time, which may be set using a configuration process, to avoid overloading available memory.

In some embodiments, the error message or indication may indicate one or more of which part of the assertions statement failed, what created the assertion and one or more reasons why it failed.

In some embodiments, the verification module 803 may apply assertions periodically and automatically, for example every five minutes, every hour, every day and so on. This may be useful if an administrator is concerned that a sensitive data resource or group of data resources may become viewable or editable by unauthorised users or groups during a system rebuild or similar situation. The periodic application of the assertion statement will generate a list of error log statements reflecting the current status of the asserted permissions and the historical situation which may be useful in identifying which part of the system rebuild, i.e. at which time, caused an inadvertent change in the asserted permissions in order that other assertions can be made, which can also relate to a particular time in the past.

In some embodiments, the remedial module 809 may be used to suggest through a user interface, or any of the above user interfaces, one or more actions that the user may take to remedy an erroneous situation. For example, if a user asserts that a group of users cannot view or edit a group of data resources, and the verification module 803 returns a FALSE statement, the remedial module 8 may be configured to determine an ordered and guided set of user operations necessary to make the assertion TRUE. By presenting through the user interface the ordered and guided set of user operations, the remedial module 809 may allow the user to make appropriate changes to either data resources or policy objects within the network-based permissioning system 104 to make the assertion TRUE, provided they have permission to make such changes. This itself may be determined with reference to the access control list (ACL) in the network-based permissioning system 104. Thus, an administrator who asserts that their group is able to view and edit a resource or group of resources, and who receives a returned FALSE statement indicative that a new member of the team only has view privileges, may be presented with one or more pop-up windows in sequence that guides the administrator through the process of modifying the appropriate one or more specific policy objects of the second data structure to make the assertion TRUE.

In some embodiments, the control module 811 may be used to automatically control certain actions responsive to a FALSE result from the verification module 805. For example, the control module 811 may automatically block an identified user's permission to perform one or more operations on the identified resource in the event that the assertion statement identifies a user not having permission to perform the identified operation on the identified data resource, and the error message is indicative that the user currently does have permission to perform the identified operation on the identified data resource. This may be performed, for example, by modifying the permissions associated with one or more policy objects associated with the one or more resources in the assertions statement. This may be performed on a temporary basis to permit the administrator to investigate the cause of the FALSE statement, which may involve reverting to the error log 807.

Such controlling actions by means of the control module 811 may only be permitted if the user making the assertion statement has certain privileges, for example is an administrator. This itself may be determined with reference to the access control list (ACL) in the network-based permissioning system 104.

Figures 9A, 9B:
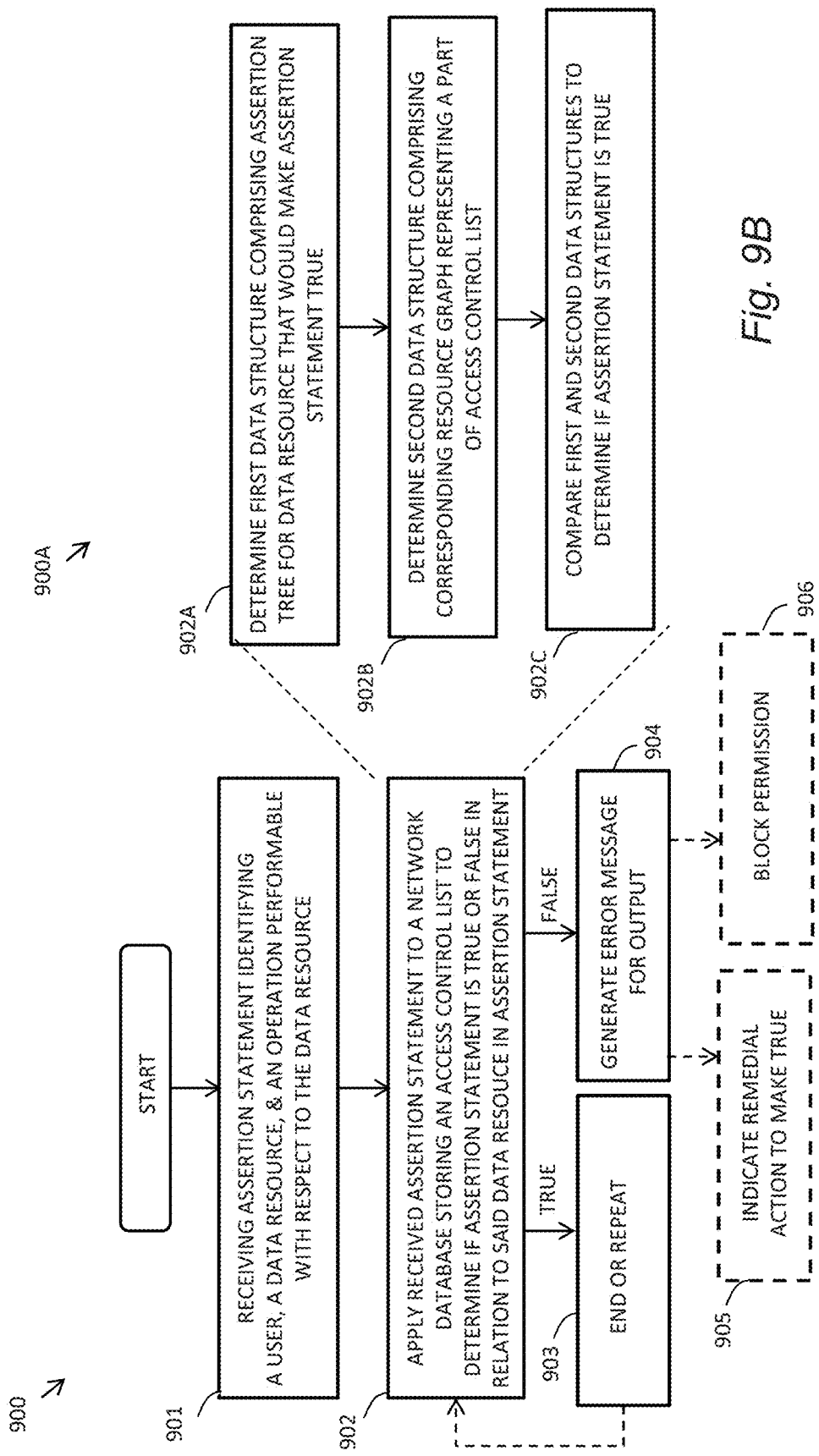
FIG. 9A is a flow-chart illustrating a method for verifying permissions, according to embodiments of this specification.
FIG. 9B is a flow-chart illustrating example operations that may form part of the FIG. 9A method.

FIG. 9A is a flowchart illustrating a method 900 for verifying network-based permissioning rights according to one or more embodiments. The method 900 is embodied in computer-readable instructions for execution by one or more processors such that the operations of the method are performed in part or in whole by the verification application 109 or another processing entity; accordingly, the method 900 is described below by way of example with reference thereto. However, it shall be appreciated that at least some of the operations of the method 900 may be deployed on various other hardware configurations, and the method is not intended to be limited to the verification application 109.

At operation 901, the operation comprises receiving, from a client device, whether directly or indirectly, an assertion statement identifying a user, a data resource and an operation performable with respect to the data resource.

At operation 902, the operation comprises applying the received assertion statement to a network database storing an access control list defining, for each of a plurality of data resources associated with the data processing platform, one or more users having permission to perform one or more operations on the respective data resource, wherein applying the assertion statement is effective to determine if the received assertion statement is true or false in relation to said data resource identified in the assertion statement.

At operation 903, if the determination is TRUE, then the method 900 may end or it may repeat at a subsequent time.

At operation 904, if the determination is FALSE, then an error message is generated for output, which may be at one or more of a user interface associated with a client device, for example client device 118 in FIG. 1, or storing the error message in the error log 807 shown in FIG. 8.

At operation 905, which is optional and hence is shown in broken lines, an indication of remedial action for making the assertion TRUE, may be presented as mentioned above.

At operation 906, which is optional and hence is shown in broken lines, one or more control operations such as blocking a user's permission may be performed as mentioned above.

FIG. 9B is a flowchart illustrating a method 900A which forms an example set of operations that may comprise operation 802 in FIG. 9A. The method 900A is embodied in computer-readable instructions for execution by one or more processors such that the operations of the method are performed in part or in whole by the verification application 109 or another processing entity; accordingly, the method 900A is described below by way of example with reference thereto. However, it shall be appreciated that at least some of the operations of the method 900A may be deployed on various other hardware configurations, and the method is not intended to be limited to the verification application 109.

At operation 902A, a first data structure is determined, comprising an assertion tree for said data resource, the assertion tree comprising an expected hierarchical resource graph that represents permissions of the identified data resource and of one or more dependencies of the identified data resource, that would make the assertion statement true.

At operation 902B, a second data structure is determined, comprising a corresponding hierarchical resource graph that represents part of the access control list.

At operation 902C, the first data structure is compared with the second data structure to determine if the assertion statement is true or false.

Example Assertion Statement Syntax

Examples of syntaxes that may be employed for the assertion statement mentioned above will now be described, although it will be appreciated that such syntaxes is not limiting. The syntax typically involves a single statement that comprises at least a user identifier, a data resource identifier and an operation performable with respect to the data resource. These identifiers and operations may be provided in any order. One or more relations may also be included, such as ON to specify that the operation is performed on the resource, or UNDER to specify that the operation is performed on the resource and all 'sub' resources dependant on the resource.

For example, the syntax may comprise one or more of:
ASSERTION USER [USER ID] OPERATION RELATION RESOURCE [RESOURCEID];
USER [USERID] RELATION RESOURCE [RESOURCEID] ASSERTION OPERATION
Etc.

The assertion, or conditional statement, may comprise one or more of CAN, CAN NOT, ONLY and CAN ONLY. A CAN statement may assert that the identified user(s) have permission to do the stated one or more operations on the resource or resources. A CAN NOT statement may assert that the identified user(s) do not have permission to do the stated one or more operations on the resource or resources. An ONLY statement may assert that the identified user(s) are the only users permitted to do the stated one or more operations on the resource or resources. A CAN ONLY statement may assert that the identified user(s) can only perform the stated one or more operations on the resource or resources and cannot perform the operations anywhere else.

The use of wildcards, e.g. using *, is permitted.

The User ID may refer to a particular user, a plurality of users, or the ID of a group of users, e.g. managers, developers, engineers etc. if these labels are meaningful to the network-based permissioning system 104.

The Resource ID may refer to a particular data resource, a plurality of data resources, or the ID of a group of resources, for example by specifying a path to a resource or by using the UNDER relational statement.

For example, to assert that a User A can perform an OPERATION on Resource 1, the assertion statement may read:
CAN USER['User A'] READ ON RESOURCE['Resource 1'];
or
USER['User A'] ON RESOURCE[' Resource 1'] CAN READ.

Multiple users may be identified, for example, using USER['User A', 'User B'].

For example, to assert that client team members have only specific operations in a subdirectory, the assertion statement may read:
ON RESOURCES UNDER /directory GROUPS ['client-team'] CAN ONLY ['subdirectory1:read', ' subdirectory2:read', 'subdirectory3:view']

For example, to assert that client team members cannot perform any operations in particular directories, the assertion statement may read:
GROUPS ['client-team'] CAN NOT ['*'] ON RESOURCES UNDER [/directory, /subdirectory]

For example, to assert that client team members cannot perform any operations in an administrator user space, the assertion statement may read:
GROUPS ['client-team'] CAN NOT ['*'] ON RESOURCES UNDER [/Users/admin/];

The assertion statement may also refer to users by attributes, for example using the assertion statement:
USER_ATTRIBUTES ['key'=['val1', 'val2']] which will be expanded to the union of all users with all listed attributes.

The syntax may also support excluding users, for example using this form of assertion statement:
USERS ['user1','user2'] EXCEPT USERS ['user2'] is equivalent to USERS ['user1']

Figure 10A:
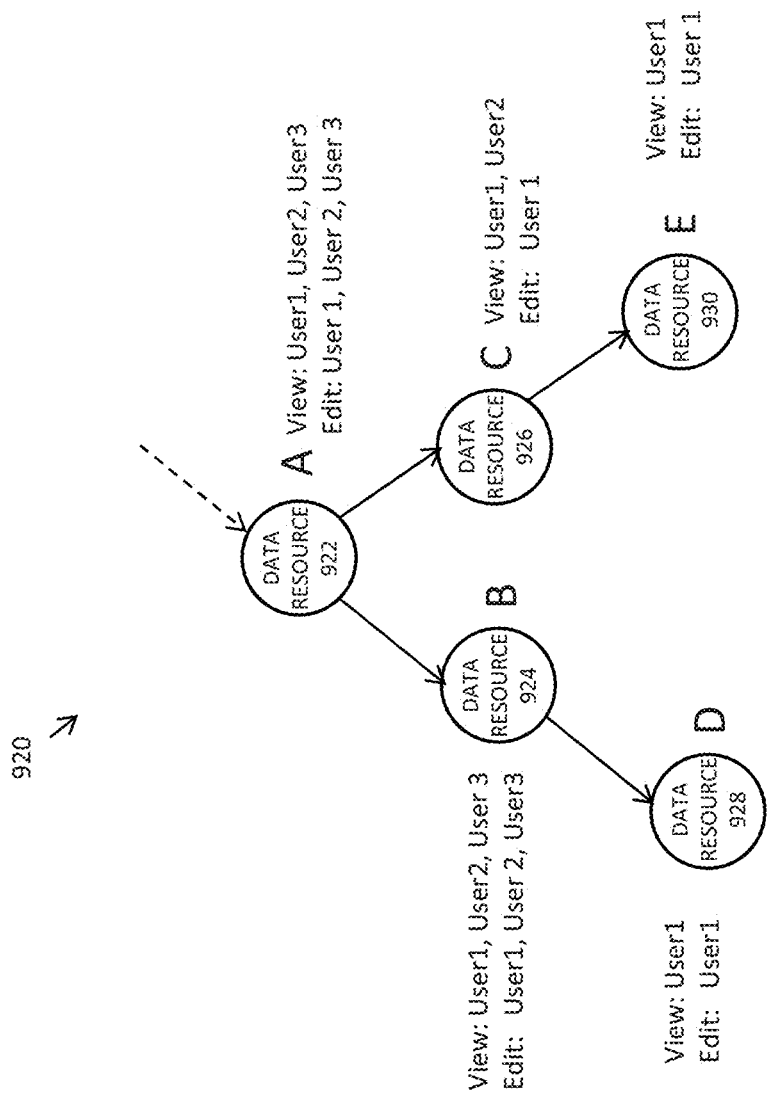
FIG. 10A is a data structure diagram illustrating a hierarchical relationship between data resources as indicated in associated policy objects maintained in a database of the network-based permissioning system, according to embodiments of this specification.

FIG. 10A is an example hierarchical section of the access control list (ACL) shown in terms of a hierarchical resource graph 920 that represents part of the access control list comprising resources A-E, 922, 924, 926, 928, 930. An indication of the permissioning policies in the respective policy objects is also shown, for Users1-3. In reality, the hierarchical access control list (ACL) for a given platform will be vast and this only represents a section for illustration purposes.

Figure 10B:
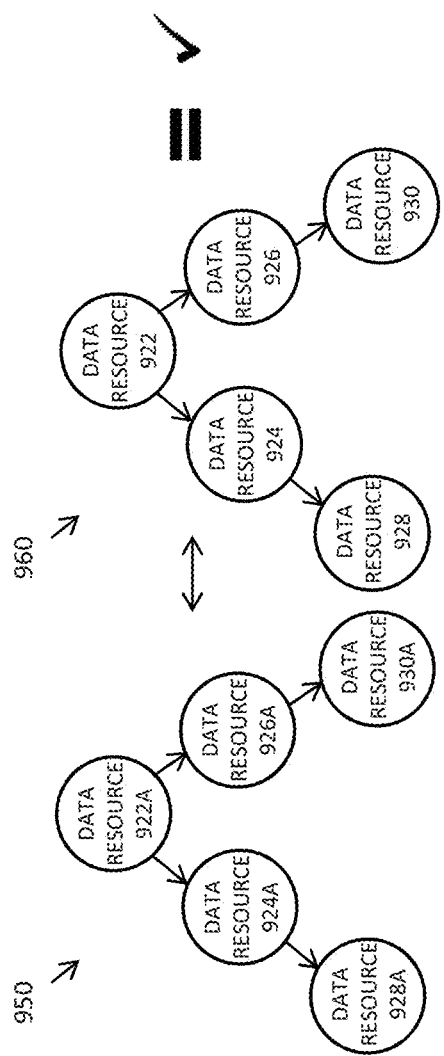
FIG. 10B shows first and second data structures, respectively representing an assertion tree and a corresponding section of the FIG. 10 structure for comparison, according to embodiments of this specification.

FIG. 10B shows an example first data structure representing an assertion tree 950 determined by the verification application 109 responsive to an assertion statement of the form:

CAN USER['User1'] VIEW UNDER RESOURCE['ResourceA'].

It will be seen that the assertion tree 950 represents the expected form of tree that would make this statement TRUE. This is determined by the assertion tree builder 705 shown in FIG. 8.

The assertion tree builder 705 further determines corresponding sections of the actual hierarchical access control list (ACL) to generate another data structure 960 reflecting the current state of permissions. By comparing the two data structures 950, 960 it will be seen that they match and hence the assertion is TRUE.

Figure 10C:
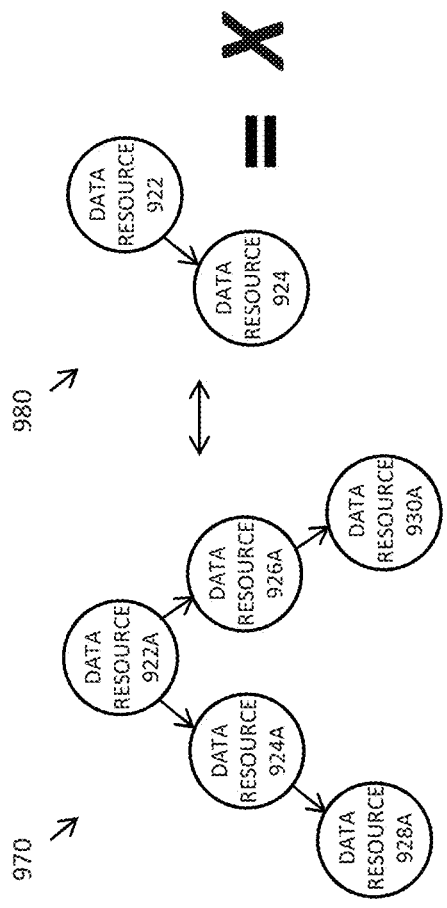
FIG. 10C shows first and second data structures, respectively representing a further assertion tree and a corresponding section of the FIG. 10 structure for comparison, according to embodiments of this specification.

FIG. 10C shows another example first data structure representing an assertion tree 970 determined by the verification application 109 responsive to an assertion statement of the form:

CAN USER['User2'] EDIT UNDER RESOURCE['ResourceA].

It will be seen that the assertion tree 970 represents the expected form of tree that would make this statement TRUE. The assertion tree builder 705 further determines corresponding sections of the actual hierarchical access control list (ACL) to generate another data structure 980 reflecting the current state of permissions. By comparing the two data structures 970, 980 it will be seen that they do not match and hence the assertion is FALSE. An error message may be generated as a result.

What is claimed is:

1. A method of verifying permissioning rights to one or more data resources associated with a data processing platform, the method being performed using one or more processors and comprising:
   receiving an assertion statement identifying a user, a data resource and an operation performable with respect to the data resource;
   in response to receiving the assertion statement,
      generating a hierarchical representation of an access control list for the data resource identified in the assertion statement to identify a current state of permissions related to the user performing the operation on the data resource; and
      evaluating the assertion statement against the current state of permissions to determine if the received assertion statement is true or false;
   in response to determining that the assertion statement is false, generating an error message for output.

2. The method of claim 1, further comprising:
   determining a first data structure comprising an assertion tree for said data resource, the assertion tree comprising an expected hierarchical resource graph that represents permissions of the identified data resource and of one or more dependencies of the identified data resource, that would make the assertion statement true,
   determining a second data structure comprising a corresponding hierarchical resource graph that represents part of the access control list; and
   comparing the first data structure with the second data structure to determine if the assertion statement is true or false.

3. The method of claim 1, wherein the error message indicates a reason why the assertion statement is false.

4. The method of claim 1, wherein the error message comprises an indication of remedial action required to make the assertion statement true.

5. The method of claim 4, wherein the indication of remedial action comprises a guided set of operations performable at a client device required to make the assertion statement true.

6. The method of claim 1, further comprising blocking the identified user's permission to performing one or more operations on the identified data resource in the event that the assertion statement identifies a user not having permission to perform the identified operation on the identified data resource, and the error message is indicative that the user currently does have permission to perform the identified operation on the identified data resource.

7. The method of claim 6, wherein blocking the identified user's permission is temporary.

8. The method of claim 1, wherein the received assertion statement is a single statement, received from a client device, conforming to one or more predetermined syntaxes.

9. The method of claim 8, wherein the one or more predetermined syntaxes permit a user identifier, a data resource identifier and an operation to be received in any order within the assertion statement.

10. The method of claim 8, wherein the one or more predetermined syntaxes permit a user identifier to define a group of plural users.

11. The method of claim 8, wherein the one or more predetermined syntaxes permit a resource identifier to define a plurality of resources under or dependent on a parent resource.

12. The method of claim 8, wherein the one or more predetermined syntaxes permit a resource identifier to comprise a path.

13. The method of claim 8, wherein the one or more predetermined syntaxes permit a conditional statement to be associated with the operation in the received assertion statement, and wherein applying the assertion statement comprises applying the conditional statement to said operation.

14. A computer apparatus comprising one or more processors and one or more non-transitory computer-readable data storage media coupled to the one or more processors and storing sequences of instructions which when executed using the one or more processors cause to perform:
   receiving an assertion statement identifying a user, a data resource and an operation performable with respect to the data resource;
   in response to receiving the assertion statement,
      generating a hierarchical representation of an access control list for the data resource identified in the assertion statement to identify a current state of permissions related to the user performing the operation on the data resource; and
      evaluating the assertion statement against the current state of permissions to determine if the received assertion statement is true or false;
   in the event that the assertion statement is false, generating an error message for output.

15. The computer apparatus of claim 14, wherein the sequences of instructions which when executed using the one or more processors further cause to perform:
   determining a first data structure comprising an assertion tree for said data resource, the assertion tree comprising an expected hierarchical resource graph that represents permissions of the identified data resource and of one or more dependencies of the identified data resource, that would make the assertion statement true, determining a second data structure comprising a corresponding hierarchical resource graph that represents part of the access control list; and comparing the first data structure with the second data structure to determine if the assertion statement is true or false.

16. The computer apparatus of claim 14, wherein the error message indicates a reason why the assertion statement is false.

17. The computer apparatus of claim 14, wherein the error message comprises an indication of remedial action required to make the assertion statement true.

18. The computer apparatus of claim 17, wherein the indication of remedial action comprises a guided set of operations performable at a client device required to make the assertion statement true.

19. The computer apparatus of claim 14, wherein the sequences of instructions which when executed using the one or more processors further cause to perform blocking the identified user's permission to performing one or more operations on the identified data resource in the event that the assertion statement identifies a user not having permission to perform the identified operation on the identified data resource, and the error message is indicative that the user currently does have permission to perform the identified operation on the identified data resource.

20. The computer apparatus of claim 19, wherein blocking the identified user's permission is temporary.

* * * * *